(12) United States Patent
Murase et al.

(10) Patent No.: US 10,440,212 B2
(45) Date of Patent: Oct. 8, 2019

(54) READING MODULE AND IMAGE READING DEVICE AND IMAGE FORMING APPARATUS THEREWITH

(71) Applicant: KYOCERA Document Solutions Inc., Osaka (JP)

(72) Inventors: Takaaki Murase, Osaka (JP); Kei Ouchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 28 days.

(21) Appl. No.: 15/826,070

(22) Filed: Nov. 29, 2017

(65) Prior Publication Data

US 2018/0152582 A1 May 31, 2018

(30) Foreign Application Priority Data

Nov. 30, 2016 (JP) .................................. 2016-232303

(51) Int. Cl.
*H04N 1/028* (2006.01)
*H04N 1/10* (2006.01)
*H04N 1/113* (2006.01)

(52) U.S. Cl.
CPC ..... *H04N 1/02885* (2013.01); *H04N 1/02865* (2013.01); *H04N 1/1056* (2013.01); *H04N 1/1135* (2013.01)

(58) Field of Classification Search
CPC ........... H04N 1/02885; H04N 1/02865; H04N 1/1056; H04N 1/1135

(Continued)

(56) References Cited

U.S. PATENT DOCUMENTS 8,345,325 B2    1/2013  Schmidt .................. 358/475
2003/0095335 A1  5/2003  Ogi ......................... 359/652
(Continued)

FOREIGN PATENT DOCUMENTS

CN    101453541 A    6/2009
JP    8-317133 A    11/1996
(Continued)

OTHER PUBLICATIONS

Chinese Office Action dated Jan. 29, 2019, issued by the State Intellectual Property Office in corresponding application CN 201711204399.5.

(Continued)

*Primary Examiner* — Quang N Vo
(74) *Attorney, Agent, or Firm* — Stein IP, LLC

(57) ABSTRACT

A reading module has a light source, an optical system imaging, as image light, reflected light of light radiated from the light source to a document, a sensor where a plurality of imaging regions for converting the image light imaged by the optical system into an electrical signal are arranged next to each other in the main scanning direction, and a housing the light source, the optical system, and the sensor. The optical system has a mirror array where a plurality of reflection mirrors whose reflection surfaces are aspherical concave surfaces are coupled together in an array in the main scanning direction, and an aperture stop portion adjusting the amount of the image light reflected from the reflection mirror. The amount of the image light striking the reflection mirror is increasingly small from opposite end parts of the reflection mirror toward its central part in the main scanning direction.

14 Claims, 8 Drawing Sheets

(58) Field of Classification Search
USPC ........................................ 358/451, 1.9, 1.15
See application file for complete search history.

(56) References Cited

U.S. PATENT DOCUMENTS

| | | | |
|---|---|---|---|
| 2009/0147321 A1 | 6/2009 | Minobe et al. ............... | 358/475 |
| 2011/0096376 A1 | 4/2011 | Minobe et al. ............... | 358/482 |
| 2014/0293372 A1* | 10/2014 | Okamoto ............ | H04N 1/0285 |
| | | | 358/475 |
| 2014/0340708 A1* | 11/2014 | Goshima ............ | H04N 1/00962 |
| | | | 358/1.15 |

FOREIGN PATENT DOCUMENTS

| | | |
|---|---|---|
| JP | 2003-121608 A | 4/2003 |
| JP | 2010-63163 A | 3/2010 |
| JP | 2014-149536 A | 8/2014 |
| JP | 2018-50182 A | 3/2018 |

OTHER PUBLICATIONS

Japanese Office Action dated Jun. 4, 2019, issued by the Japanese Patent Office in corresponding application JP 2016-232303.

\* cited by examiner

READING MODULE AND IMAGE READING DEVICE AND IMAGE FORMING APPARATUS THEREWITH

INCORPORATION BY REFERENCE

This application is based upon and claims the benefit of priority from the corresponding Japanese Patent Application No. 2016-232303 filed on Nov. 30, 2016, the entire contents of which are incorporated herein by reference.

BACKGROUND

The present disclosure relates to a reading module that is incorporated in digital copiers, image scanners, and the like and that reads reflected image light of the light radiated to a document, and to an image reading device and an image forming apparatus incorporating such a reading module.

Conventional optical imaging systems for image reading devices incorporated in multifunction peripherals and the like adopting an electro-photographic process include a reduction optical system where images are formed on a reduced scale and a unity magnification optical system where images are formed at unity magnification without being reduced.

In the reduction optical system, a reduced image is formed on an image sensor whose size is smaller than that of a document by use of a plurality of plane mirrors and an optical lens, and then the image is read. In the reduction optical system, as an image sensor, a charge-coupled device called a CCD sensor is used. The reduction optical system advantageously has a deep depth of field. Here, the depth of field is the range in which, even when a subject (here a document) is displaced in the direction of the optical axis from the in-focus position, the subject can be seen as if in focus. This means that, with a deep depth of field, even when the document is displaced from the predetermined position, it is possible to obtain a satisfactory image.

On the other hand, the reduction optical system inconveniently has a very large optical path length (the distance light travels from a subject to the sensor) of 200 to 500 mm. In image reading devices, for the purpose of securing the optical path length in a limited space in a carriage, the direction in which light travels is changed by use of a plurality of plane mirrors. This increases the number of components required, leading to an increased cost. When a lens is used in the optical system, chromatic aberration occurs due to variation in the refractive index with wavelength. To correct the chromatic aberration, a plurality of lenses is required. As will be seen from the above, using a plurality of lenses becomes one of the factors that increase the cost.

In the unity magnification optical system, an image is read by being imaged, with a plurality of erect-image rod-lenses with unity magnification arranged in an array, on an image sensor whose size is similar to that of a document. In the unity magnification optical system, as an image sensor, a photoelectric conversion device called CMOS (complementary MOS) sensor is used. The unity magnification optical system advantageously has the following advantages. A smaller optical path length of 10 to 20 mm compared with the reduction optical system helps achieve compactness. Imaging by use of rod lenses alone eliminates the need for mirrors required in the reduction optical system. This helps make a scanner unit that incorporates a unity magnification optical system sensor slim. The simple construction helps achieve cost reduction. On the other hand, the unity magnification optical system has a very small depth of field, and thus when a document is displaced in the direction of the optical axis from a predetermined position, a severe blur results from image bleeding due to different magnifications of the individual lenses. As a result, it is inconveniently impossible to uniformly read a book document or a document with an uneven surface.

In recent years, a method has been proposed in which, instead of the reduction optical system or the unity magnification optical system described above, an image is read by use of a reflection mirror array in the imaging optical system. In this method, a plurality of reflection mirrors is arranged in an array, and a document read in different reading regions corresponding to the reflection mirrors on a region-by-region basis is formed into an inverted image on a reduced scale on a sensor. Unlike in the unity magnification optical system that uses a rod-lens array, one region is read and imaged with one optical system. By adopting the telecentric optical system as the imaging system, when a document is read on a region-to region basis, no image bleeding occurs as a result of images with different magnifications overlapping with each other; it is thus possible to suppress image blurring and achieve a compound-eye reading method.

In this method, the optical system uses mirrors alone, and thus unlike in a case where the optical system uses a lens, no chromatic aberration occurs. This makes it unnecessary to correct chromatic aberration, and thus helps reduce the number of elements constituting the optical system.

SUMMARY

According to one aspect of the present disclosure, a reading module includes a light source, an optical system, a sensor, and a housing. The light source radiates light to a document. The optical system images, as image light, reflected light of the light radiated from the light source to the document. In the sensor, a plurality of imaging regions for converting the image light imaged by the optical system into an electrical signal are arranged next to each other in the main scanning direction. The housing houses the light source, the optical system, and the sensor. The optical system includes a mirror array, a plurality of aperture stop portions, and a plurality of light amount adjusting portions. In the mirror array, a plurality of reflection mirrors whose reflection surfaces are aspherical concave surfaces are coupled together in an array in the main scanning direction. The aperture stop portions are each arranged in the optical path of image light between a reflection mirror and an imaging region, and adjusts the amount of image light reflected from the reflection mirror. The amount of image light that strikes the reflection mirror is increasingly small from opposite end parts of the reflection mirror toward its central part in the main scanning direction.

Further features and advantages of the present disclosure will become apparent from the description of embodiments given below.

DETAILED DESCRIPTION

Figure 1:
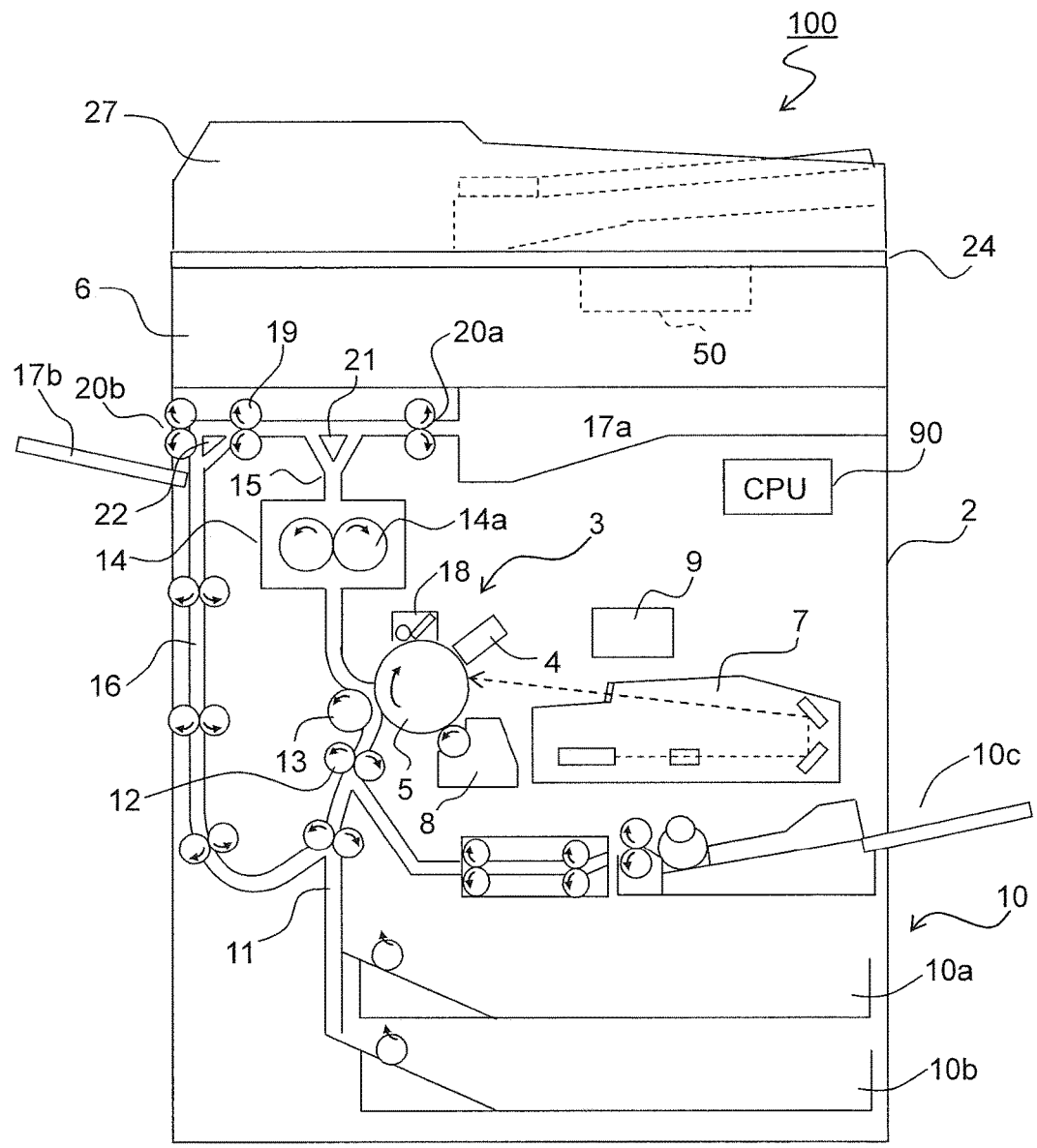
FIG. 1 is a side sectional view showing the overall construction of an image forming apparatus incorporating an image reading portion that uses a reading module according to the present disclosure.

Hereinafter, embodiments of the present disclosure will be described with reference to the accompanying drawings. FIG. 1 is a diagram showing an outline of the construction of an image forming apparatus 100 incorporating an image reading portion 6 that uses a reading module 50 according to the present disclosure. In the image forming apparatus 100 shown in FIG. 1 (here a digital multifunction peripheral is taken as an example), a copy operation proceeds as follows. In the image reading portion 6, which will be described later, document image data is read and is converted into an image signal. On the other hand, in an image forming portion 3 in a multifunction peripheral main body 2, a photosensitive drum 5 that rotates in the clockwise direction in FIG. 1 is electrostatically charged uniformly by a charging unit 4. Then, by a laser beam from an exposure unit (such as a laser scanner unit) 7, an electrostatic latent image is formed on the photosensitive drum 5 based on the document image data read in the image reading portion 6. Then, developer (hereinafter, referred to as toner) is attached to the formed electrostatic latent image by a developing unit 8, and thereby a toner image is formed. Toner is fed to the developing unit 8 from a toner container 9.

Toward the photosensitive drum 5 having the toner image formed on it as described above, a sheet is conveyed from a sheet feeding mechanism 10 via a sheet conveyance passage 11 and a registration roller pair 12 to the image forming portion 3. The sheet feeding mechanism 10 includes sheet feed cassettes 10a and 10b and a stack bypass (manual feed tray) 10c arranged over the sheet feed cassettes 10a and 10b. When the conveyed sheet passes through a nip between the photosensitive drum 5 and a transfer roller 13 (image transfer portion), the toner image on the surface of the photosensitive drum 5 is transferred to the sheet. Then, the sheet having the toner image transferred to it is separated from the photosensitive drum 5, and is conveyed to a fixing portion 14, which has a fixing roller pair 14a, so that the toner image is fixed there. The sheet having passed through the fixing portion 14 is distributed among different conveyance directions by passage switching mechanisms 21 and 22 arranged at branch points in a sheet conveyance passage 15. The sheet is then, as it is (or after being conveyed to a reverse conveyance passage 16 and being subjected to two-sided copying), discharged onto a sheet discharge portion composed of a first discharge tray 17a and a second discharge tray 17b.

After toner image transfer, toner left unused on the surface of the photosensitive drum 5 is removed by a cleaning device 18. Electric charge remaining on the surface of the photosensitive drum 5 is removed by a destaticizer (unillustrated) arranged on the downstream side of the cleaning device 18 in the rotation direction of the photosensitive drum 5.

In an upper part of the multifunction peripheral main body 2, the image reading portion 6 is arranged, and a platen (document presser) 24 is openably/closably provided that presses and thereby holds a document placed on a contact glass 25 (see FIG. 2) of the image reading portion 6. On the platen 24, a document conveyance device 27 is provided.

In the multifunction peripheral main body 2, a control portion (CPU) 90 is arranged that controls the operation of the image forming portion 3, the image reading portion 6, the document conveyance device 27, and the like.

Figure 2:
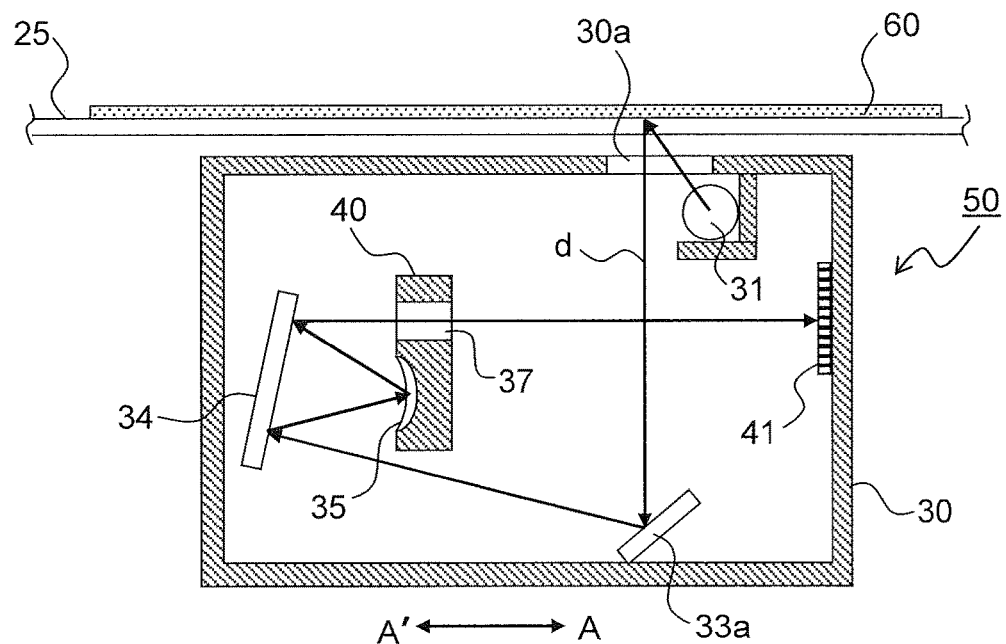
FIG. 2 is a side sectional view showing the internal structure of a reading module according to one embodiment of the present disclosure incorporated in the image reading portion.
Figure 3:
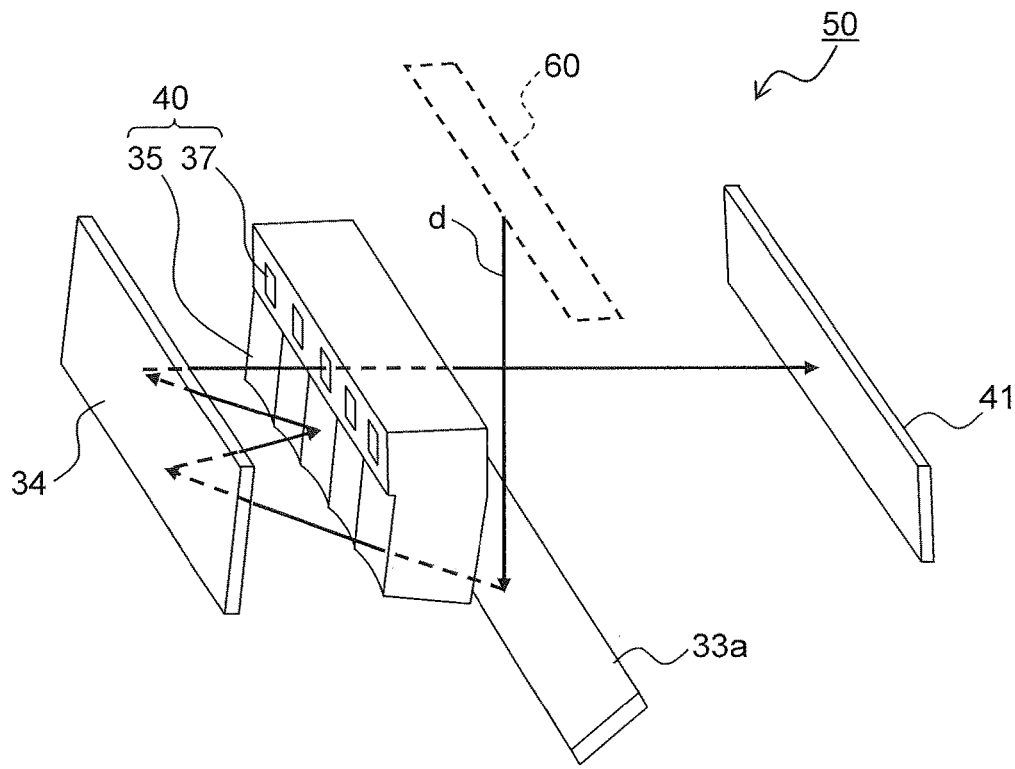
FIG. 3 is a partial perspective view showing the internal structure of the reading module according to the embodiment.
Figure 4:
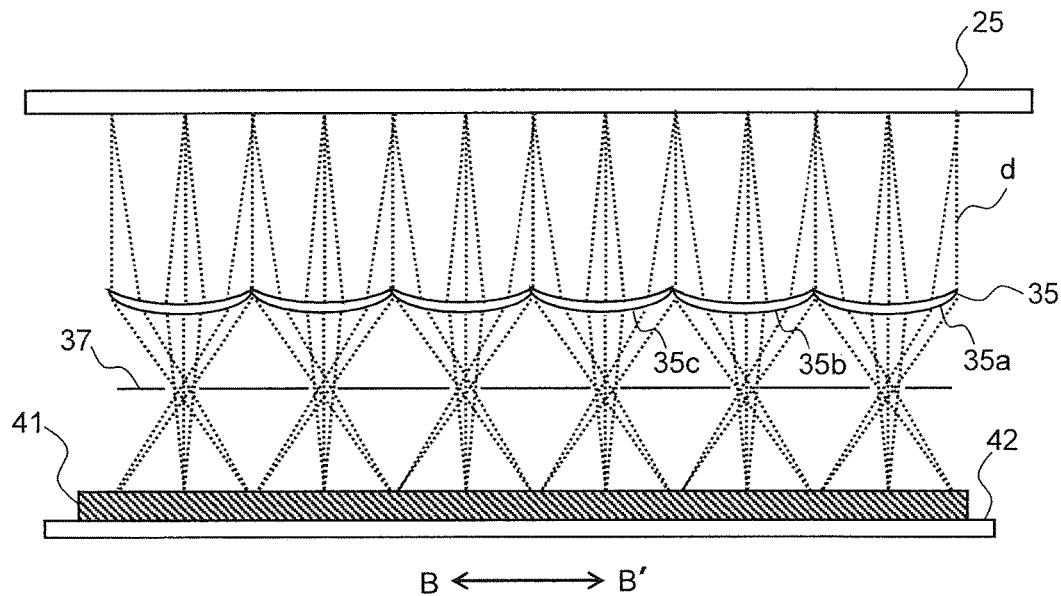
FIG. 4 is a sectional plan view showing, in a model where transmission of rays of light is allowed, the configuration between an optical unit and a sensor in the reading module according to the embodiment.

FIG. 2 is a side sectional view showing the internal structure of a reading module 50 according to one embodiment of the present disclosure incorporated in the image reading portion 6. FIG. 3 is a perspective view of the reading module 50 according to this embodiment, showing the optical path from a document 60 to a sensor 41. FIG. 4 is a sectional plan view showing the configuration between an optical unit 40 and the sensor 41 in the reading module 50 according to this embodiment. Although a mirror array 35 constituting the optical unit 40 shown in FIG. 4 reflects rays of light, for the sake of convenience of description, FIG. 4 shows a model where the optical unit 40 transmits rays of light.

The reading module 50 reads an image on the obverse side (lower side in FIG. 2) of the document 60 placed on the contact glass 25 while moving in the sub-scanning direction (the direction indicated by arrows A and A'). The reading module 50 also reads an image on the obverse side of the document 60 conveyed by the document conveyance device 27 (see FIG. 1) while remaining at rest right under the automatic reading position of the contact glass 25.

As shown in FIG. 2, the reading module 50 includes, in a housing 30 thereof, a light source 31, a plane mirror 33a, a turning mirror 34, a mirror array 35 composed of a plurality of reflection mirrors whose reflection surfaces are aspherical surfaces, an aperture stop portion 37, and a sensor 41 as a reading means. The sensor 41 is supported on a sensor substrate 42 (see FIG. 4). As the sensor 41, a CCD or CMOS image sensor is used according to the design. The reading module 50 has a home position right under a shading plate (unillustrated) for acquiring white reference data.

With this configuration, to read a document image in a fixed-document manner, image reading proceeds as follows. First, a document 60 is placed on the contact glass 25 with the image side down. Then, while the image side of the document 60 is irradiated with light emitted from the light source 31 and transmitted through an opening 30a the reading module 50 is moved at a predetermined speed from the scanner home side to the scanner return side. As a result, the light reflected from the image side of the document 60, that is, the image light d (indicated by the solid arrows in FIG. 2), has its optical path changed by the plane mirror 33a, and is then reflected on the turning mirror 34. The reflected image light d is converged by the mirror array 35, is reflected again on the turning mirror 34, passes through the aperture stop portion 37, and is imaged on the sensor 41. The image light d of the formed image is, in the sensor 41, divided into pixels to be converted into electrical signals commensurate with the densities of individual pixels.

On the other hand, to read a document image in a sheet-through manner, image reading proceeds as follows. The reading module 50 is moved to right under the image reading region (image reading position) of the contact glass 25. Then, the image side of a document, which is conveyed one sheet after another while being lightly pressed against the image reading region by the document conveyance device 27, is irradiated with light from the light source 31. Then, the image light d reflected from the image side is imaged on the sensor 41 via the plane mirror 33a, the turning mirror 34, the mirror array 35, the turning mirror 34, and the aperture stop portion 37.

As shown in FIG. 3, the mirror array 35 and the aperture stop portion 37 are integrally formed of the same material and are integrated into a unit as the optical unit 40. By integrally forming the mirror array 35 and the aperture stop portion 37, it is possible to hold the position of the mirror array 35 relative to the aperture stop portion 37 with high accuracy. Thereby, it is possible to effectively prevent imaging performance from degrading as a result of the relative position varying with expansion or contraction of the mirror array 35 and the aperture stop portion 37 due to change in temperature.

The turning mirror 34 is arranged at a position facing the mirror array 35. The turning mirror 34 reflects both rays of light (the image light d) which travel from the document 60 via the plane mirror 33a to be incident on the mirror array 35 and rays of light (the image light d) which are reflected from the mirror array 35 to enter the aperture stop portion 37.

As shown in FIG. 4, the mirror array 35, which images the image light d on the sensor 41, is composed of a plurality of reflection mirrors 35a, 35b, 35c . . . , which correspond to predetermined regions of the sensor 41, coupled together in an array in the main scanning direction (the direction indicated by arrows B and B').

In the configuration according to this embodiment, the image light d reflected from reading regions Ra, Rb . . . (see FIG. 5) of the document 60 separated in the main scanning direction has its optical path changed by the plane mirror 33a and the turning mirror 34 (see FIG. 2), and is incident on the reflection mirrors 35a, 35b, 35c . . . of the mirror array 35. The image light d is reduced at predetermined reduction magnifications by the reflection mirrors 35a, 35b, 35c . . . , is reflected again on the turning mirror 34, passes through the aperture stop portion 37, and is focused on corresponding imaging regions of the sensor 41 to form inverted images.

The inverted images formed on the imaging regions 41a, 41b . . . are converted into digital signals, and thus magnification enlargement correction is performed through data interpolation according to the reduction magnifications for the respective imaging regions 41a, 41b . . . to reverse the data into erect images. Then, the images of the imaging regions 41a, 41b . . . are connected together to form an output image.

The aperture stop portion 37 is arranged at the focal points of the reflection mirrors 35a, 35b, and 35c . . . constituting the mirror array 35. The physical separation distance (the distance in the up/down direction in FIG. 2) between the aperture stop portion 37 and the mirror array 35 is determined according to the reduction magnification of the mirror array 35. In the reading module 50 according to this embodiment, the turning mirror 34 reflects rays of light twice, and this makes it possible to secure the optical path length from the mirror array 35 to the aperture stop portion 37, and thus to minimize the incidence/reflection angle of the image light d with respect to the mirror array 35. As a result, it is possible to suppress curvature of images formed in the imaging regions 41a, 41b . . . .

When the turning mirror 34 is divided into a plurality of mirrors, light reflected by edge parts of the mirrors acts as stray light, and strikes the mirror array 35 or enters the aperture stop portion 37. By using a single plane mirror as the turning mirror 34 as in this embodiment, the effect of stray light can be prevented even when both of the rays of light overlap each other on the turning mirror 34. Although, in this embodiment, the plane mirror 33a is used to reduce the size of the reading module 50 in its height direction, it is also possible to adopt a configuration where no plane mirror 33a is used.

In a compound-eye reading method in which the mirror array 35 is used as in this embodiment, when the imaging magnification varies with the position on a document (the optical path length between the reflection mirrors and the document) within the region corresponding to the reflection mirrors 35a, 34b, 35c . . . , when the document 60 floats off the contact glass 25, images overlap or separate from each other at a position next to border parts of the reflection mirrors 35a, 35b, 35c . . . , resulting in an abnormal image.

In this embodiment, a telecentric optical system is adopted between the document 60 and the mirror array 35. The telecentric optical system has the feature that the principal ray of the image light d that passes through the center of the aperture stop portion 37 is perpendicular to the surface of the document. This prevents the imaging magnifications of the reflection mirrors 35a, 35b, 35c . . . from varying even when the document position varies; it is thus possible to obtain a reading module 50 having a deep depth of field that does not cause image bleeding even when the document 60 is read in a form divided into fine regions. To achieve that, the principal ray needs to remain perpendicular to the surface of the document irrespective of the document position, and this requires a mirror array 35 whose size in the main scanning direction is equal to or larger than the size of the document.

In the compound-eye reading method in which the mirror array 35 is used as described above, when the image light d reflected from the reflection mirrors 35a, 35b, 35c . . . and transmitted through the aperture stop portion 37 is imaged in a predetermined region on the sensor 41, the image light d traveling from outside the reading region, may, as stray light, strike a region next to the predetermined region on the sensor 41.

Figure 5:
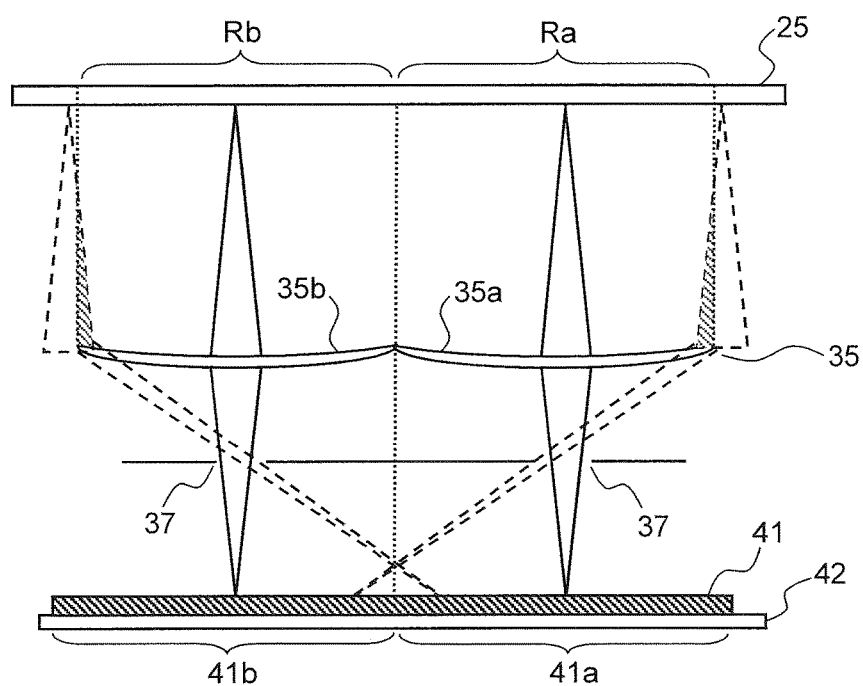
FIG. 5 is a partly enlarged view showing the optical path between the reflection mirrors and the sensor in FIG. 4, showing how light traveling from outside reading regions is imaged on the sensor via the reflection mirrors.

FIG. 5 is a partly enlarged view showing the optical path between the reflection mirrors 35a and 35b and the sensor 41 in FIG. 4. As shown in FIG. 5, the light from the reading regions Ra and Rb corresponding to the reflection mirrors 35a and 35b is imaged in the corresponding imaging regions 41a and 41b on the sensor 41. Here, the rays of light (indicated by hatched regions in FIG. 5) inward of the principal ray, even though they belong to the light traveling from outside the reading regions Ra and Rb, are imaged on the sensor 41 by the reflection mirrors 35a and 35b. Specifically, the light reflected from the reflection mirror 35a strikes the adjacent imaging region 41b, and the light reflected from the reflection mirror 35b strikes the adjacent imaging region 41a. These parts of the image light, even though feeble, form inverted images corresponding to different reading regions, and thus, if superimposed on proper images which are supposed to be formed in the imaging regions 41a and 41b, produce abnormal images.

Figure 6:
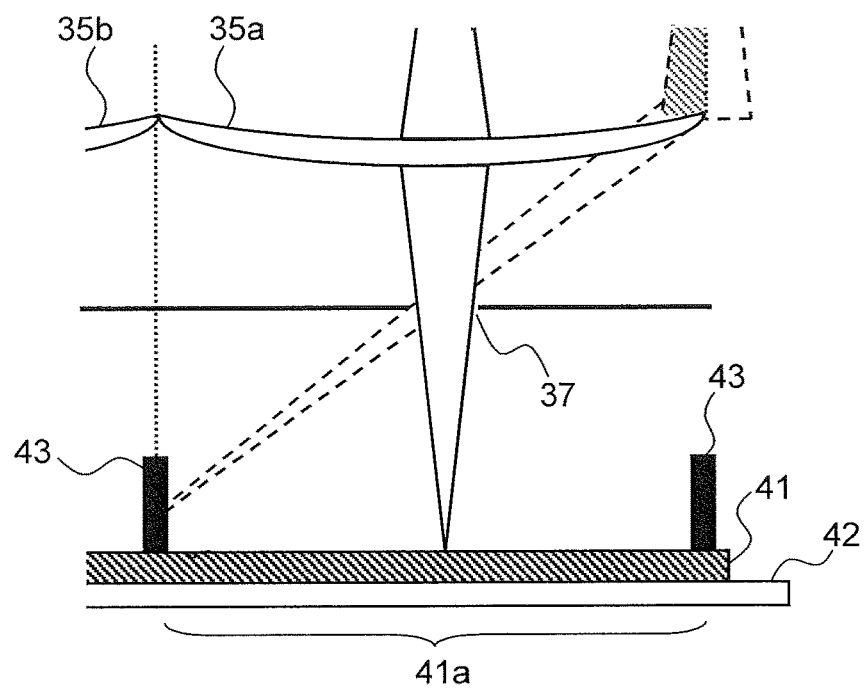
FIG. 6 is a partly enlarged view showing the optical path between the reflection mirrors and an imaging region on the sensor, showing a configuration where light shielding walls are provided at the boundaries of the imaging region.

Thus, in this embodiment, the imaging magnifications of the reflection mirrors 35a, 35b, 35c . . . of the mirror array 35 are set to be reduction magnifications, and as shown in FIG. 6, light shielding walls 43 are formed to protrude from the boundaries between the imaging regions 41a and 41b of the sensor 41 in the direction of the aperture stop portion 37.

Here, as shown in FIG. 6, for example, of the image light d which is to be imaged in the imaging region 41a on the sensor 41, the light traveling from outside the reading region Ra is shielded by the light shielding wall 43; it is thus possible to prevent the stray light from striking the imaging region 41b arranged next to the imaging region 41a in the main scanning direction. Here, assuming that the reflection mirrors 35a, 35b, 35c . . . are set at a unity magnification, the reflection mirrors 35a, 35b, 35c use the entire area over the image forming regions 41a, 41b . . . up to their boundaries to form images of the image light d. As a result, no space can be secured for forming the light shielding walls 43 at the boundaries of the imaging regions 41a, 41b . . . . To secure the space for forming the light shielding walls 43, it is necessary to set the imaging magnifications of the reflection mirrors 35a, 35b, 35c . . . to be reduction magnifications as described above.

The optical unit 40 that includes the mirror array 35 and the aperture stop portion 37 preferably is, with consideration given to the cost, formed of resin by injection molding. Accordingly, it is necessary to determine the reduction magnifications with a predetermined margin, with consideration given to expansion or contraction due to change in temperature around the reading module 50 (hereinafter, referred to as environmental temperature). However, reducing the reduction magnifications of the reflection mirrors 35a, 35b, 35c . . . necessitates, when a sensor 41 with cell sizes (imaging regions) corresponding to the magnifications is used, a higher resolution on the sensor 41, and even when a sensor 41 with cell sizes for use in unity magnification optical systems is used, a lower resolution results. Thus, it is preferable to maximize the reduction magnifications.

Figure 7:
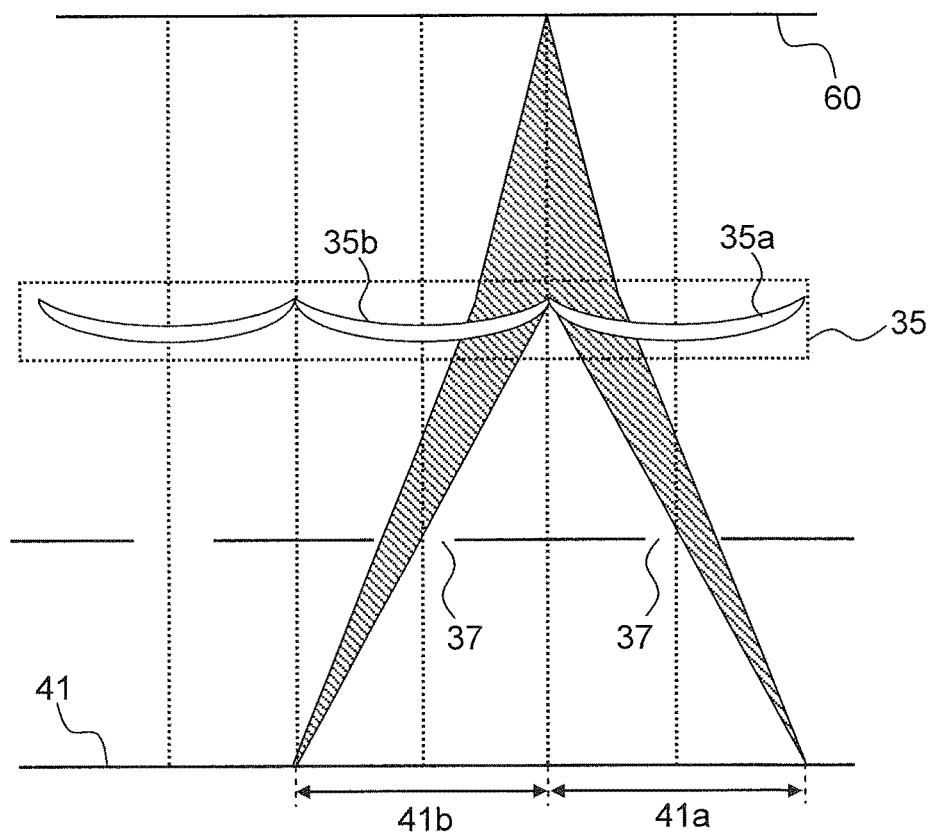
FIG. 7 is a partly enlarged view showing the optical path between the reflection mirrors and the sensor in FIG. 4, showing the optical path of light reflected from boundaries between the reflection mirrors.

FIG. 7 is a partly enlarged view showing the optical path between the reflection mirrors 35a and 35b and the sensor 41 in FIG. 4. As shown in FIG. 7, the light reflected at the boundary between the reflection mirrors 35a and 35b is distributed in opposite directions in the main scanning direction, and passes respectively through aperture stop portions 37 to strike the imaging regions 41a and 41b on the sensor 41 corresponding to the reflection mirrors 35a and 35b to be imaged. Here, comparing the amounts of light observed at a central part and at an end part of the imaging regions 41a and 41b reveals that the amount of light observed at the end part is a half (about 50%) of the amount of light observed at the central part. Thus, in the reading module 50 according to the present disclosure, there is provided a light amount adjusting member 70 which adjusts the amount of incident light which strikes the imaging regions 41a, 41b . . . on the sensor 41.

Figure 8:
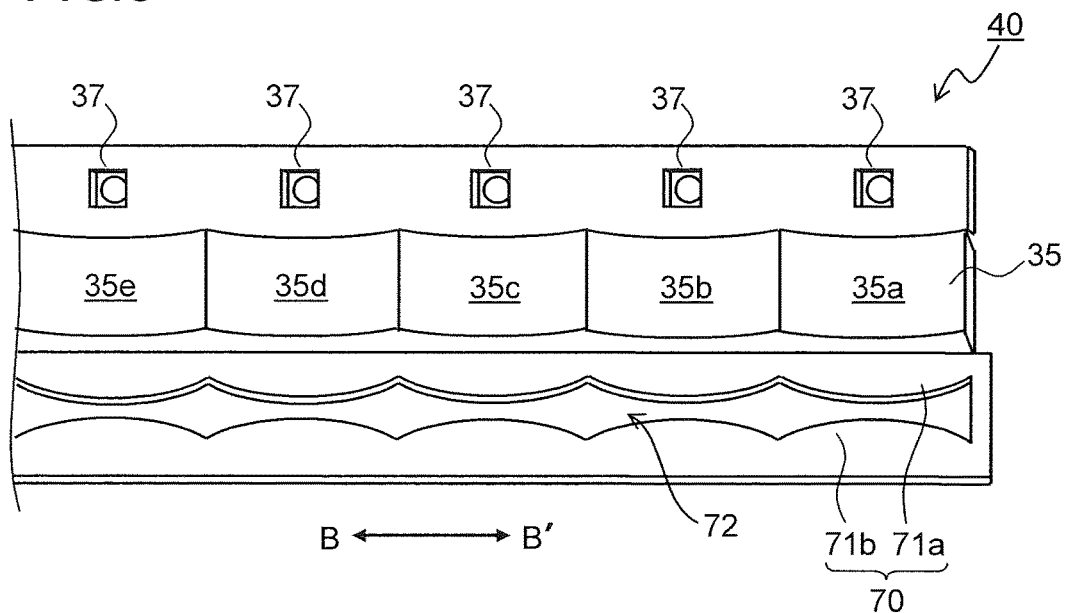
FIG. 8 is a partial perspective view of an optical unit used in a reading module according to a first embodiment of the present disclosure.
Figure 9:
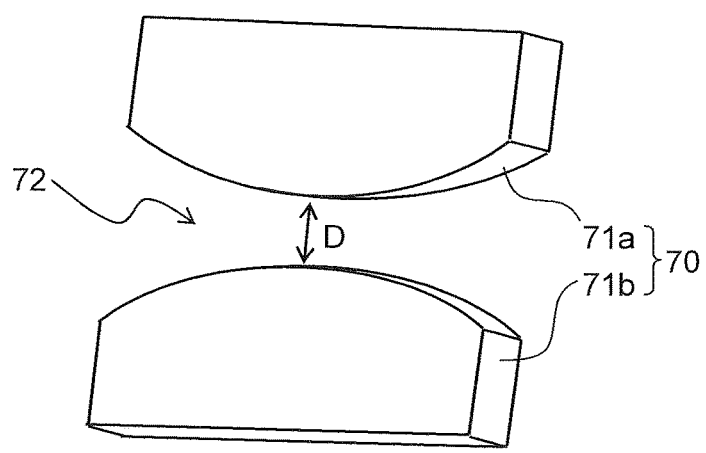
FIG. 9 is a perspective view of a light amount adjusting member provided in the optical unit.

FIG. 8 is a partial perspective view of an optical unit 40 used in a reading module 50 according to a first embodiment of the present disclosure. FIG. 9 is a perspective view of the light amount adjusting member 70 provided in the optical unit 40. As shown in FIG. 8, in the main scanning direction in which the reflection mirrors 35a, 35b, 35c . . . of the mirror array 35 are continuously arranged, as many light amount adjusting members 70 as the number of the reflection mirrors 35a, 35b, 35c . . . are continuously formed. FIG. 9 shows only one unit of the light amount adjusting members 70 corresponding to one of the reflection mirrors 35a, 35b, 35c . . . . FIG. 8 shows only five reflection mirrors 35a to 35e of the mirror array 35.

As shown in FIGS. 8 and 9, the light amount adjusting member 70 is composed of a first light shielding portion 71a arranged on the mirror array 35 side and a second light shielding portion 71b arranged opposite the first light shielding portion 71a across a predetermined interval. The first light shielding portion 71a and the second light shielding portion 71b are coupled together at opposite end parts of the mirror array 35 in its longitudinal direction. A slit 72 formed between the first light shielding portion 71a and the second light shielding portion 71b has the largest width D at opposite end parts in the main scanning direction (the direction indicated by arrows B and B'), the width D becoming increasingly small toward a central part. In this embodiment, the slit 72 is given a width D of 2.7 mm at the opposite end parts in the main scanning direction and a width D of 1.0 mm at the central part in the main scanning direction.

The image light d reflected from the document 60 has its optical path changed by the plane mirror 33a, and then passes through the slit 72 in the light amount adjusting member 70. Here, the amount of light at the central part in the main scanning direction at which the width D of the slit 72 is small is restricted as compared with that at the opposite end parts. The image light d having passed through the slit 72 is reflected on the turning mirror 34, and then strikes the reflection mirrors 35a, 35b, 35c . . . of the mirror array 35.

As described above, the light reflected from the boundaries between the reflection mirrors 35a, 35b, 35c . . . is distributed among the imaging regions 41a, 41b . . . on the sensor 41 to be imaged; thus the amount of the image light d imaged on opposite end parts of the imaging regions 41a, 41b . . . in the main scanning direction is smaller than that on a central part thereof. However, the image light d has previously passed through the light amount adjusting member 70, and thus the amount of light at the central part is smaller than that at the opposite end parts in advance.

Figure 10:
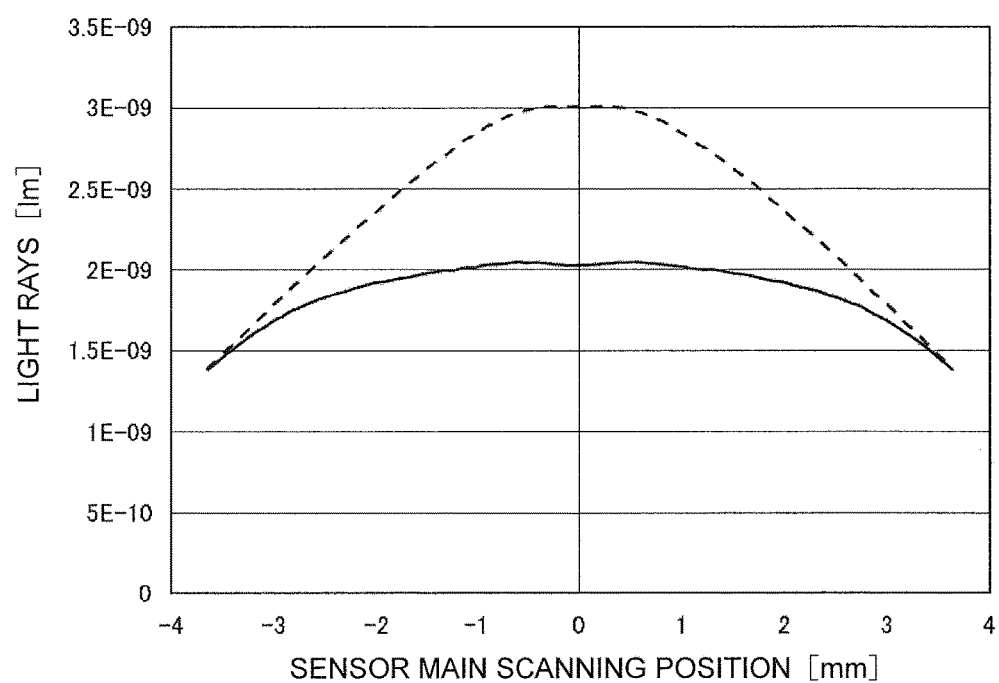
FIG. 10 is a diagram, obtained by simulation, showing the difference in light amount distribution among imaging regions on the sensor in the main scanning direction with and without the light amount adjusting member.

FIG. 10 is a diagram, obtained by simulation, showing the difference in light amount distribution among the imaging regions 41a, 41b . . . on the sensor 41 in the main scanning direction with and without the light amount adjusting member 70 shown in FIGS. 8 and 9. In FIG. 10, the horizontal axis of the diagram represents the position of the imaging regions 41a, 41b . . . in the main scanning direction, with 0 mm at the center of the imaging regions. The vertical axis represents the amount of light in the rays of light that strike the imaging regions 41a, 41b . . . . Here, the result obtained when no light amount adjusting member 70 is provided is represented by a broken line, and the result obtained when the light amount adjusting member 70 is provided is represented by a solid line.

FIG. 10 reveals the following. When the light amount adjusting member 70 is provided, the difference between the amounts of light at the central part and at the opposite end parts of the imaging regions 41a, 41b . . . is small; that is, the amounts of the image light d imaged on the imaging regions 41a, 41b . . . are equalized in the main scanning direction. Thus, it is possible to effectively suppress image degradation resulting from the difference in noise between the central part and the end parts of images read in the imaging regions 41a, 41b . . . .

In this embodiment, the light amount adjusting member 70 is integrally formed with the mirror array 35. Thus, the light amount adjusting member 70 expands and contracts at the same rate as the mirror array 35 as it expands and contracts due to change in temperature, and thus it is possible to keep high positional accuracy between the reflection mirrors 35a, 35b, 35c . . . and the corresponding light amount adjusting members 70. Thus, it is possible to suppress vignetting of rays of light resulting from variation in the positional accuracy of the light amount adjusting members 70, and also to effectively suppress variation in the amount of light at the central part and at the opposite end parts of the imaging regions 41a, 41b . . . in the main scanning direction.

Figure 11:
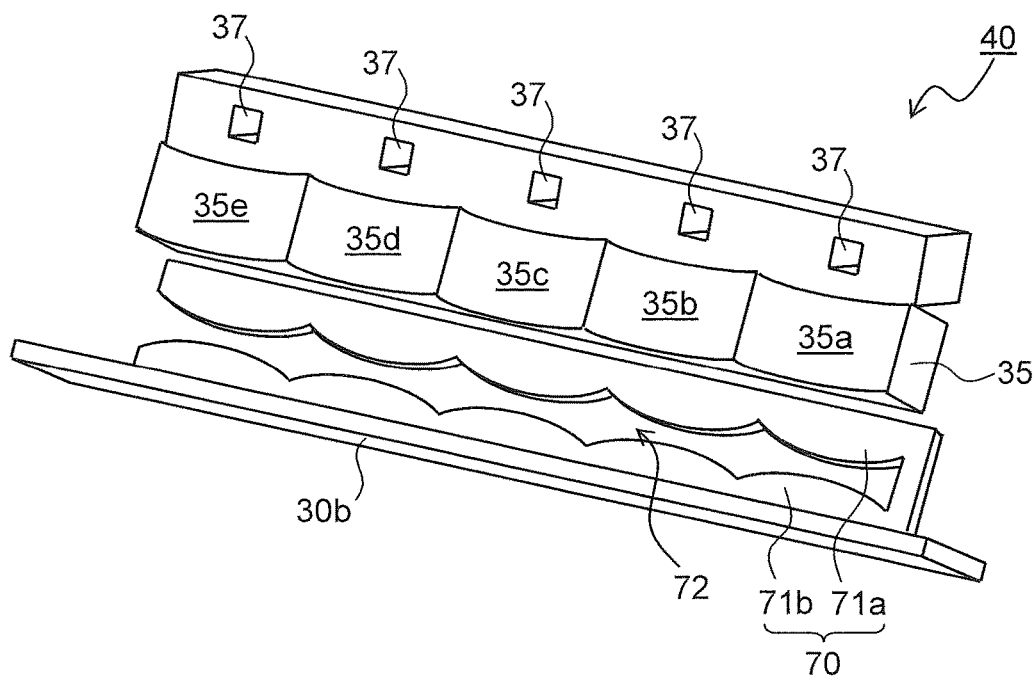
FIG. 11 is a partial perspective view of an optical unit used in a reading module according to a second embodiment of the present disclosure.

FIG. 11 is a partial perspective view of an optical unit 40 used in a reading module 50 according to a second embodiment of the present disclosure. In this embodiment, the light amount adjusting member 70 is formed integrally with a bottom surface 30b of the housing 30. Otherwise, the structure of the reading module 50 is similar to that in the first embodiment.

In this embodiment, the image light d having passed through the light amount adjusting member 70 has a smaller amount of light at the central part in the main scanning direction than that at the opposite end parts in advance; thus, the amounts of the image light d imaged on the imaging regions 41a, 41b . . . are equalized in the main scanning direction. Thus, as in the first embodiment, it is possible to effectively suppress image degradation resulting from the difference in noise between the central part and the opposite end parts, in the main scanning direction, of images read in the imaging regions 41a and 41b.

The light amount adjusting member 70 is formed integrally with the bottom surface 30b of the housing 30, and this simplifies the configuration of the optical unit 40 as compared with the first embodiment where the light amount adjusting member 70 is formed integrally with the optical unit 40. This facilitates masking operation when the mirror array 35 is formed by vapor deposition. Also the surface accuracy of the mirror array 35 is improved when the optical unit 40 is formed of a resin material.

Figure 12:
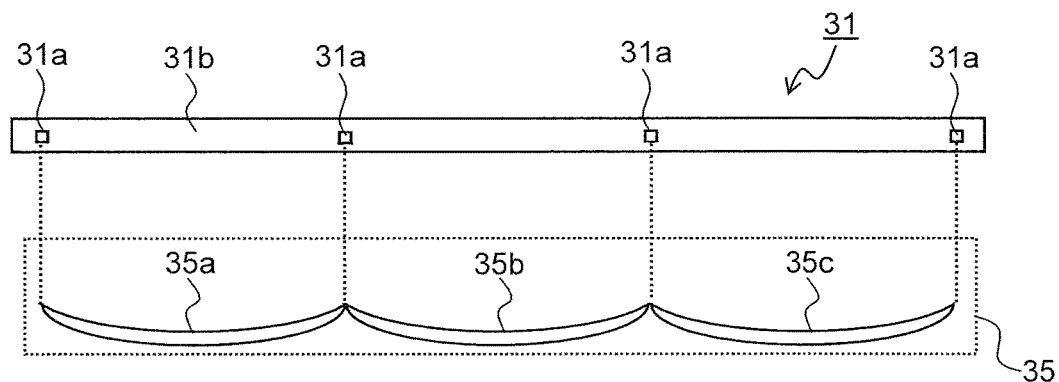
FIG. 12 is a partial perspective view of a light source and a mirror array used in a reading module according to a third embodiment of the present disclosure.

FIG. 12 is a partial perspective view of a light source 31 and a mirror array 35 used in a reading module 50 according to a third embodiment of the present disclosure. The light source 31 is composed of LEDs (light-emitting diode) 31a and a substrate 31b on which the LEDs 31a are mounted. In this embodiment, on the substrate 31b, the LEDs 31a are arranged only at positions corresponding to the boundaries between the reflection mirrors 35a, 35b, 35c of the mirror array 35.

The light emitted from the LEDs 31a of the light source 31 is reflected on the document 60 as image light d. The image light d has its optical path changed by the plane mirror 33a to be reflected by the turning mirror 34, and then strikes the reflection mirrors 35a, 35b, 35c . . . of the mirror array 35.

As described above, the light reflected from the boundaries between the reflection mirrors 35a, 35b, 35c . . . is distributed among the imaging regions 41a, 41b . . . on the sensor 41 to be imaged, and thus the amount of the image light d imaged on the opposite end parts of the imaging regions 41a, 41b . . . in the main scanning direction is smaller than that on the central part. However, the LEDs 31a are arranged only at the positions corresponding to the boundaries between the reflection mirrors 35a, 35b, 35c . . . , and thus, from the beginning, the amount of image light d at the central part in the main scanning direction is smaller than that at the opposite end parts.

Figure 13:
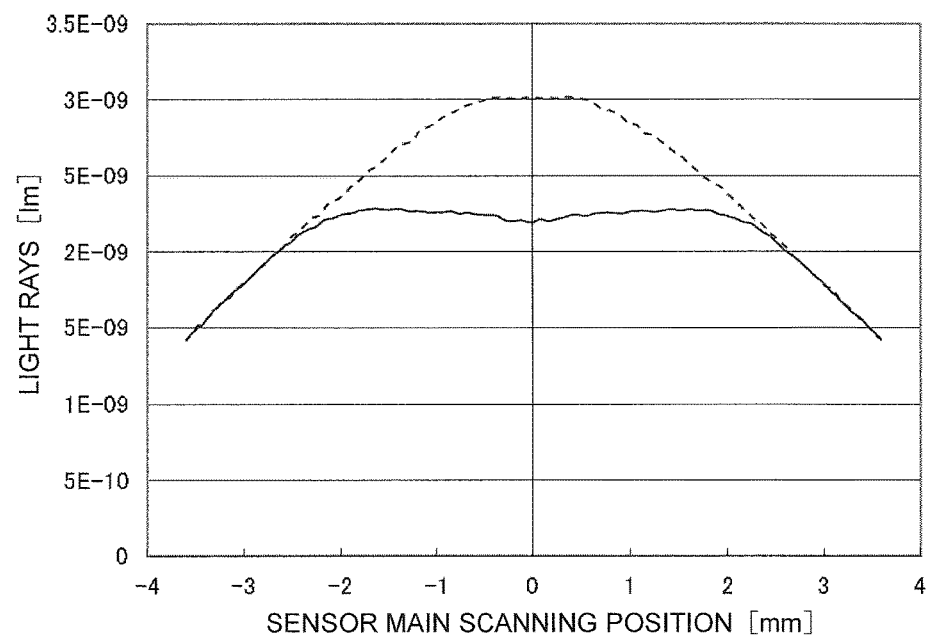
FIG. 13 is a diagram, obtained by simulation, showing the difference in light amount distribution among imaging regions on the sensor in the main scanning direction with LEDs arranged on the substrate.

FIG. 13 is a diagram, obtained by simulation, showing the difference in light amount distribution among the imaging regions 41a, 41b . . . on the sensor 41 in the main scanning direction with the LEDs 31a arranged on the substrate 31b. In FIG. 13, the horizontal axis of the diagram represents the position of the imaging regions 41a, 41b . . . in the main scanning direction, with 0 mm at the center of the imaging regions. The vertical axis represents the amount of light in the rays of light that strike the imaging regions 41a, 41b Here, the result obtained when the LEDs 31a are evenly arranged also at positions corresponding to the central part of the reflection mirrors 35a, 35b, 35c . . . is represented by a broken line, and the result obtained when the LEDs 31a are arranged only at positions corresponding to the boundaries between the reflection mirrors 35a, 35b, 35c is represented by a solid line.

FIG. 13 reveals the following. When the LEDs 31a are arranged only at the positions corresponding to the boundaries between the reflection mirrors 35a, 35b, 35c . . . , the difference between the amounts of light at the central part and at the opposite end parts of the imaging regions 41a, 41b . . . is small; that is, the amounts of the image light d imaged on the imaging regions 41a, 41b . . . are equalized in the main scanning direction. Thus, it is possible to effectively suppress image degradation resulting from the difference in noise between the central part and the end parts of images read in the imaging regions 41a, 41b . . . .

Figure 14:
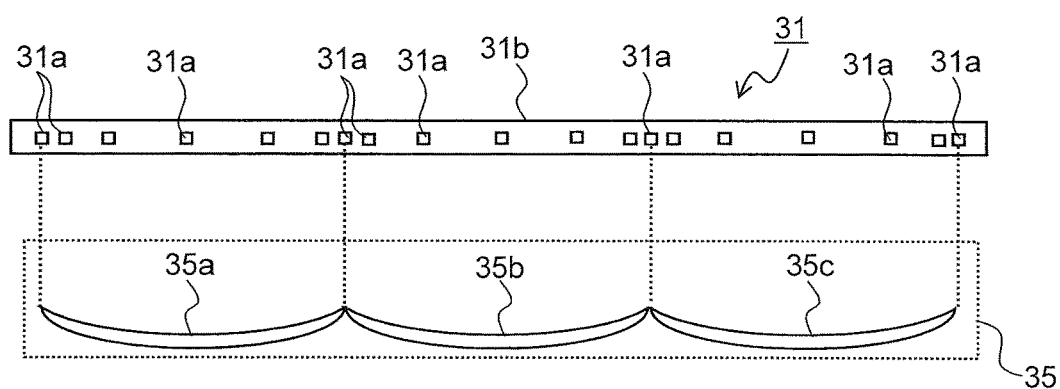
FIG. 14 is a partial perspective view of a light source and a mirror array used in a reading module according to a fourth embodiment of the present disclosure.

FIG. 14 is a partial perspective view of a light source 31 and a mirror array 35 used in a reading module 50 according to a fourth embodiment of the present disclosure. In this embodiment, on the substrate 31b, the LEDs 31a are arranged such that their arrangement intervals are increasingly small from the position corresponding to the central part, in the main scanning direction, of the reflection mirrors 35a, 35b, 35c of the mirror array 35 toward the positions corresponding to the opposite end parts. Otherwise, the structure of the reading module 50 is similar to that in the third embodiment.

In this embodiment, the arrangement intervals between the LEDs 31a at the positions corresponding to the opposite end parts of the reflection mirrors 35a, 35b, 35c in the main scanning direction are smaller than those at the positions corresponding to the central part of the reflection mirrors 35a, 35b, 35c in the main scanning direction. As a result, from the beginning, the amount of image light d is smaller at the central part in the main scanning direction than that at the opposite end parts; this reduces the difference between the amounts of the image light d at the central part and at the opposite end parts of the imaging regions 41a, 41b . . . . Thus, as in the third embodiment, it is possible to effectively suppress image degradation resulting from the difference in noise between the central part and the opposite end parts, in the main scanning direction, of images read in the imaging regions 41a, 41b . . . .

Figure 15:
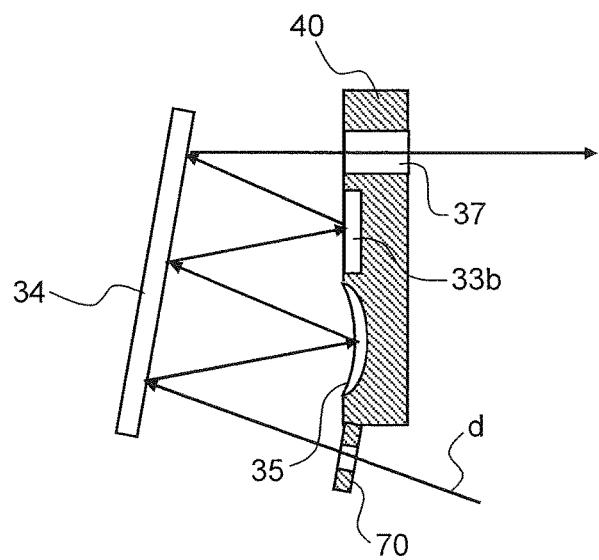
FIG. 15 is a partial sectional view showing a modified example of the reading module according to the first embodiment, showing a configuration where image light is reflected three times on a turning mirror.

The embodiments described above are in no way meant to limit the present disclosure, which thus allows for many modifications and variations within the spirit of the present disclosure. For example, although in the above-described embodiments, image light d which travels from the document 60 via the plane mirror 33a to strike the mirror array 35 and image light d which is reflected from the mirror array 35 to enter the aperture stop portion 37 are each reflected on the turning mirror 34 once, that is, reflection on it takes place twice in total, as shown in FIG. 15, with a plane mirror 33b arranged between the mirror array 35 and the aperture stop portion 37, image light d may be reflected on the turning mirror 34 three times or more.

Although, in the above-described first and second embodiments, the surfaces, which face each other, of the first light shielding portion 71a and the second light shielding portion 71b constituting the light amount adjusting member 70 are in the shape of arcs (curved surfaces) as seen from the direction of incidence of light, as long as they are in such a shape as to reduce the amount of light at the central part in the main scanning direction as compared with that at the opposite end parts, the surfaces of the first light shielding portion 71a and the second light shielding portion 72b facing each other do not necessarily have to be in the shape of arcs; they may instead be, for example, in the shape of triangles or trapezoids.

In the above-described fourth embodiment, there is no particular restriction on the arrangement intervals between, and the number of, the LEDs 31a, and thus, these can be set as necessary according to the number of the reflection mirrors 35a, 35b, 35c . . . or their dimension in the main scanning direction. Instead of the above-described third and fourth embodiments, as the LEDs 31a arranged at the positions corresponding to the boundaries between the reflection mirrors 35a, 35b, 35c . . . , ones having higher light emission intensity than that of the LEDs 31a arranged at the positions corresponding to the central part of the reflection mirrors 35a, 35b, 35c in the main scanning direction may be used. Or, the voltage applied to the LEDs 31a arranged at the positions corresponding to the boundaries between the reflection mirrors 35a, 35b, 35c . . . may be set higher than the voltage applied to the LEDs 31a arranged at the positions corresponding to the central part of the reflection mirrors 35a, 35b, 35c in the main scanning direction.

By combining the configuration of the third and fourth embodiments, where the arrangement of the LEDs 31a is adjusted, with that of the first and second embodiments, where the light amount adjusting member 70 is provided, it is possible to effectively reduce the difference between the amounts of light at the central part and at the opposite end parts of the imaging regions 41a, 41b . . . .

Although the above-described embodiments deal with, as an example of an image reading device, the image reading portion 6 incorporated in the image forming apparatus 100, the present disclosure is applicable equally to an image scanner used separately from the image forming apparatus 100.

The present disclosure is applicable to image reading devices provided with a reading module adopting a reading configuration where reflection mirrors are arranged in an array. Based on the present disclosure, it is possible to provide a reading module that can reduce the variation in the amount of incident light on the imaging regions, in the main scanning direction, on the sensor corresponding to the reflection mirrors and that can effectively suppress image degradation resulting from the difference in noise between the central part and the opposite end parts in the main scanning direction, and to provide an image reading device and an image forming apparatus provided with such a reading module.

What is claimed is:

1. A reading module comprising:
    a light source which radiates light to a document;
    an optical system which images, as image light, reflected light of the light radiated from the light source to the document; and
    a sensor in which a plurality of imaging regions for converting the image light imaged by the optical system into an electrical signal are arranged next to each other in a main scanning direction, wherein
    the optical system comprises:
        a mirror array in which a plurality of reflection mirrors whose reflection surfaces are aspherical concave surfaces are coupled together in an array in the main scanning direction;
        a plurality of aperture stop portions each provided in an optical path of the image light between a reflection mirror and an imaging region of the sensor, the plurality of aperture stop portions adjusting an amount of the image light reflected from the reflection mirror; and
        a light amount adjusting member having a slit through which the image light strikes the reflection mirror, the slit having a width which is increasingly small from the opposite end parts of the reflection mirror toward the central part thereof in the main scanning direction, and
    an amount of the image light that strikes the reflection mirror is increasingly small from opposite end parts of the reflection mirror toward a central part thereof in the main scanning direction.

2. The reading module of claim 1, wherein
as many light amount adjusting members as the number of the reflection mirrors are continuously arranged in the main scanning direction.

3. The reading module of claim 1, wherein
the light amount adjusting members are formed integrally with the mirror array.

4. The reading module of claim 1, wherein
the light amount adjusting members are formed integrally with a housing.

5. The reading module of claim 1, wherein
the light source includes a substrate extending in the main scanning direction and a plurality of light-emitting diodes mounted on the substrate, and
an amount of light, in the main scanning direction, emitted from the light-emitting diodes is adjusted to be increasingly small from the opposite end parts of the reflection mirror toward the central part thereof in the main scanning direction.

6. The reading module of claim 5, wherein
the light-emitting diodes are arranged on the substrate only at positions corresponding to boundaries between the reflection mirrors.

7. The reading module of claim 5, wherein
the light-emitting diodes are arranged on the substrate such that arrangement intervals thereof are increasingly small from a position corresponding to the central part of the reflection mirror in the main scanning direction toward positions corresponding to the opposite end parts.

8. The reading module of claim 2, wherein an optical path of the image light traveling toward each reflection mirror and an optical path of the image light traveling toward an aperture stop portion run in a same direction, and a turning mirror is arranged that bends the image light reflected from the reflection mirror toward the aperture stop portion, and the turning mirror bends the image light twice or more times on a same reflection surface thereof, including bending the image light traveling toward the reflection mirror and bending the image light reflected from the reflection mirror toward the aperture stop portion.

9. The reading module of claim 1, wherein the mirror array and the aperture stop portions are integrally formed.

10. The image reading device of claim 1, wherein the optical system is a telecentric optical system where the image light is parallel to an optical axis on a document side of the mirror array, and forms an inverted image on the sensor.

11. The image reading module of claim 10, wherein imaging magnifications of the reflection mirrors for the respective imaging regions are set at reduction magnifications, and a light shielding wall is provided which is formed to protrude from a boundary between adjacent imaging regions toward the aperture stop portions, the light shielding wall shielding stray light which is to be incident on the imaging regions.

12. The image reading module of claim 11, wherein image data read in the imaging regions of the sensor undergoes magnification enlargement correction through data interpolation according to the reduction magnifications to reverse the data into erect images, and then the images in the imaging regions are connected together to form an output image.

13. An image reading device, comprising:

a contact glass fixed to a top surface of an image reading portion;

a document conveyance device which is openable/closable upward and downward with respect to the contact glass, the document conveyance device conveying a document to an image reading position of the contact glass; and the reading module of claim 1 arranged to be reciprocable under the contact glass in a sub-scanning direction, wherein the reading module is capable of reading an image of a document placed on the contact glass while moving in the sub-scanning direction, and the reading module is capable of reading an image of a document conveyed to the image reading position while remaining at rest at the position facing the image reading position.

14. An image forming apparatus comprising the image reading device of claim 13.

* * * * *